United States Patent [19]

Cowgill et al.

[11] 4,397,605
[45] Aug. 9, 1983

[54] MECHANIZED STAND HANDLING APPARATUS FOR DRILLING RIGS

[76] Inventors: Charles F. Cowgill; Frank J. Di Bella, both of 11507 Parkriver Dr., Houston, Tex. 77070

[21] Appl. No.: 267,617

[22] Filed: May 27, 1981

Related U.S. Application Data

[60] Division of Ser. No. 45,642, Jun. 5, 1979, Pat. No. 4,274,778, which is a continuation of Ser. No. 833,145, Sep. 14, 1977, abandoned.

[51] Int. Cl.³ .............................................. E21B 19/14
[52] U.S. Cl. ..................................... 414/745; 414/741; 294/94
[58] Field of Search ................ 294/86.3, 94, 88, 104, 294/116; 414/22, 741, 745, 694

[56] References Cited

U.S. PATENT DOCUMENTS

| | | | |
|---|---|---|---|
| 2,989,198 | 6/1961 | Bradley | 414/694 |
| 3,093,402 | 6/1963 | Sisson | 294/116 X |
| 3,741,517 | 6/1973 | Pogonowski | 294/88 X |
| 3,863,753 | 2/1975 | Shank, Jr. | 294/116 X |
| 3,937,514 | 2/1976 | Langowski | 294/88 |
| 4,126,348 | 11/1978 | Palmer | 294/88 |

Primary Examiner—Robert J. Spar
Assistant Examiner—Terrance L. Siemens
Attorney, Agent, or Firm—William H. Maxwell

[57] ABSTRACT

Apparatus for the handling of drill collar and pipe stands and comprised of a hydraulically mechanized "Derrickman" and "Derrick Floor Hand" and associated fingerboard lock bars and all of which are adapted to remote control in the placement of the stands in a derrick, both in alignment with the rotary table and fully placed within the fingers, the stand handling mechanism being characterized by articulated arms extensible by actuator means housed entirely within the confines thereof for compactness.

27 Claims, 20 Drawing Figures

MECHANIZED STAND HANDLING APPARATUS FOR DRILLING RIGS

This application is a division of application Ser. No. 045,642, filed June 5, 1979 now U.S. Pat. No. 4,274,778 issued June 23, 1981 which was a continuation of application Ser. No. 833,145, filed Sept. 14, 1977 and now abandoned.

BACKGROUND

The exploration for oil and gas is being extended to great depths, with a commensurate demand upon drill rig capabilities, said demands exceeding human capabilities and/or endurance. For example, remotely controlled tools and equipment have replaced manually operable tongs and elevators and the like, and for instance extensible arms are used to manipulate stands of drill collar and drill pipe into and out of alignment with the central axis of the well. Generally, offshore drilling rigs have derricks of greater size than those of land rigs, and because of the rigors imposed by offshore inclement weather said offshore rigs are most highly automated; and to these ends offshore derricks are of greater girth and afford more space for said automation, at the "derrickman" platform and at the "derrick floor hand" with which this invention is concerned, particularly those tools which manipulate the stands of drill collar and drill pipe and the like into and out of working position. In this respect, it is an object to provide improved oil well tools for mechanical control of said stands within the derrick confines, and especially within the smaller confines of existent land based rigs to which this equipment is retrofitted with facility.

Heretofore, extensible cylinder and piston units have been used at both the derrick floor and at the derrickman's level, and mounted so as to slew the collar and pipe stands into the desired positions. These tools have not been completely satisfactory in that they tend to be cumbersome and slow moving and require additional tools such as "finger guides" and which must be separately controlled. And, due to the restricted cross section at the elevated platform level, it is most common that such devices project through and from the exterior of the rig. It is an object of this invention to confine this tool within the rig. Furthermore, prior art tools at the derrickman level have not operated so as to place or retrieve stands fully from within the finger slots, as it is an object herein to do so with facility, and even within the confines of the smaller land rigs and/or masts.

The "derrickman" level or platform is usually 86 feet above the derrick floor when running 90 foot stands, and is comprised of a "monkeyboard" extending from the off draw works side of the derrick toward the center and terminating short of the space through which the traveling block passes, and a pair of "fingerboards" are at each side of the monkeyboard and with slots normal to the monkeyboard to receive the upper end portions of the stands extending therebetween and into and out of the slots. The slots are narrow (5½ inches), and it is therefore an object of this invention to provide a stand positioning tool referred to herein as a "derrickman" having an active stand engaging gripper head no wider than the distance between the two next adjacent stands between which it moves to place a stand or retrieve the same. To this end there is provided extensible arms traveling the length of the monkeyboard and rotatable on a vertical axis to project a gripper head into engagement with the stand so as to position the same. The significant features of this invention are, that the carriage therefor is no greater in width than the monkeyboard in the case of the derrickman, and that the extensible arms and gripper head are no greater in width than the space between adjacent stands.

The diameters of drill collar and drill pipe run by drilling rigs varies greatly and it is therefore an object of this invention to accomodate a range of sizes thereof by the gripper head of the automated tool as hereinafter disclosed. For example, collar and drill pipe used in a rig will vary from 3½ inch diameter to 11¼ inch diameter, and though gripper jaws can be made to accomodate each particular size the jaws according to the present invention are such as to accomodate a range of sizes. In practice, one gripper jaws are such as to embrace the smaller range of 3½ to 5 inch diameter pipe, while another gripper jaws are such as to embrace the larger range of 5 inch to 11¼ inch diameter pipe, or collars as the case may be. It is to be understood however, that any range of size may be adapted to. A feature of this invention is the combination of the two or more aforesaid gripper jaws within confines of the one gripper head, whereby a full range of pipe sizes is accomodated.

In view of the foregoing, it is an object to provide a reinforced monkeyboard characterized by a track disposed for travel of the carriage coextensive therewith. It is also an object to provide a turret confined within the width of said carriage to carry the extensible arms on a vertically disposed axis. It is also an object to provide extensible arms that retract together in order to conserve space. And it is also an object to provide means incorporated within said extensible arms to maintain a substantially vertical disposition of the gripper head axis in parallel relation to said vertical turret axis, and derrick axis as well, and for alignment within the aforesaid finger slots. Still another object of this invention is to automate each of the aforesaid functional means, all within the structural confines thereof, and by means of hydraulics for the positive actuation thereof and accurate placement of the stands of drill collar and pipe to be positioned thereby. In practice, short stroke cylinder and piston units are employed and the motion thereof augmented with gearing and/or cams, with limiting means for remote control and precision operation of the rectilinear, rotary and lever actions coordinated, all as hereinafter described.

SUMMARY OF INVENTION

The Mechanized Stand Handling Apparatus herein disclosed is adapted to be retrofitted to oil well drilling rigs, either as a "Derrickman" or as a "Derrick Floor Hand"; both units comprising the same fundamental combination of means. The difference between said two units being a shiftable carriage support for the derrickman and a fixed pedestal support for the derrick floor hand, the former being adapted to the elevated platform in the derrick where the stands are racked in slots, and the latter being adapted to the derrick floor where the stands are racked off to the side in set-back areas. The mechanized units of the present inventions are characterized by their articulated arms and gripper head function to quickly engage and remove pipe of varied diameters. The assembly of arms is extensible to position the gripper head and hold the axis of the same vertically disposed at all times, whereby alignment with the substantially vertical axes of the stands is assured. Extensibility of the gripper head is such that it is projected to the center axis of the derrick, and retractile to its carriage or pedestal as the case may be. In the case of the "Derrickman" the carriage involves a turret by which the articulated arms are slewed to either side of the monkeyboard beneath which said carriage travels to the station of the fingerboard slot into which the stand is to be placed or retrieved. In the case of the "Derrick Floor Hand" the pedestal is fixed to the derrick floor; the latter unit being larger as a rule than the former, as is shown. In carrying out this invention, drill rig procedures remain the same while the functions of the crew are replaced by these two said derrick tools, so that reeducation of the drilling crew is unnecessary when converting to the present equipment that improves operations and makes the same most practical for deep hole and when operating under adverse climatic conditions.

DRAWINGS

The various objects and features of this invention will be fully understood from the following detailed description of the typical preferred forms and application thereof, throughout which description reference is made to the accompanying drawings, in which.

PREFERRED EMBODIMENT

Exploration for oil and gas is extending to ever greater depths, and as the pipe strings grow longer the set-back area on the drill floor also expands. As this area expands it becomes increasingly difficult and more dangerous to move the stands of drill collar and drill pipe relative to the center of the rig. For example, to set a 90 foot stand of 5 inch drill pipe 18 ft. back from the rotary table can take 350 lbs. of force; and when the stand is set back on the floor it takes a comparable force in the derrick to rack the pipe in the platform fingers. Of primary importance therefore, stand moving equipment must have adequate power separate from the elevators used in lifting the stands into position and running alignment.

Figure 1:
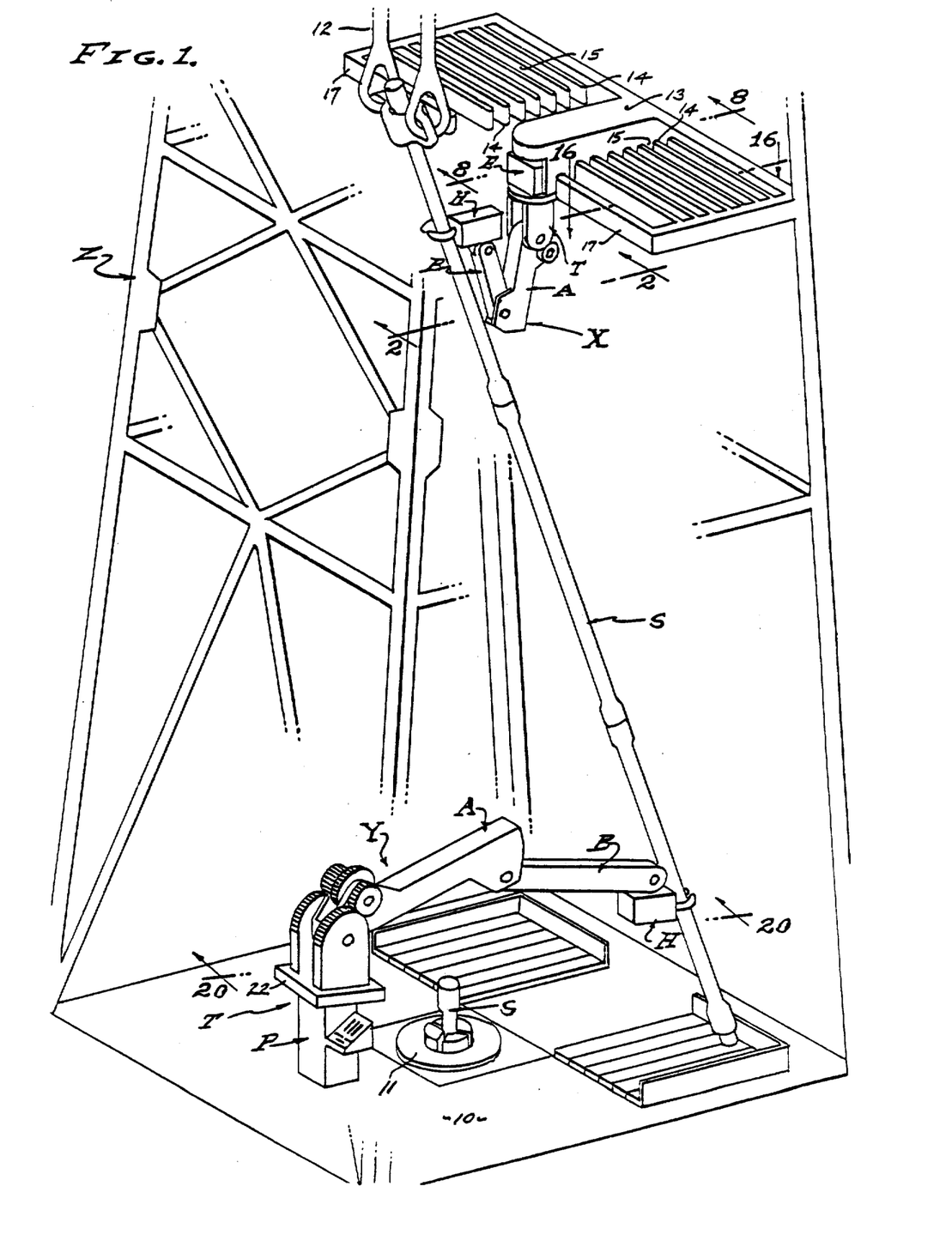
FIG. 1 is a perspective view of a drilling rig equiped with the apparatus of the present invention.

Referring now to the drawings, FIG. 1 discloses the relationship of the stand S to the "Derrickman" X and the "Derrick Floor Hand" Y, all within the derrick Z. The derrick Z is a structural truss that extends upward from a platform or floor 10 through which the rotary table 11 passes the stands S of drill collar and/or drill pipe to form a drilling string (not shown). In practice, a stand of collar or pipe is comprised of three 30 foot sections which are raised and lowered within the derrick by means of an elevator 12, the bales of which are shown. The racking areas for the stands S are at the off draw works side of the derrick at each side thereof, while the derrickman platform is at the 86 foot level and comprised of a monkeyboard 13 projecting forwardly from the off draw works side of the derrick with a finger board 14 at each side thereof to overlie the racking areas at the derrick floor respectively. The platform boards 13 and fingers 14 terminate short of the travel area of the derrick elevator 12, and they are spaced so as to present right and left alleys through which the upper end portions of the stands pass to station locations for lateral entry into the slots 15 that characterize the derrickman platform.

Figure 16:
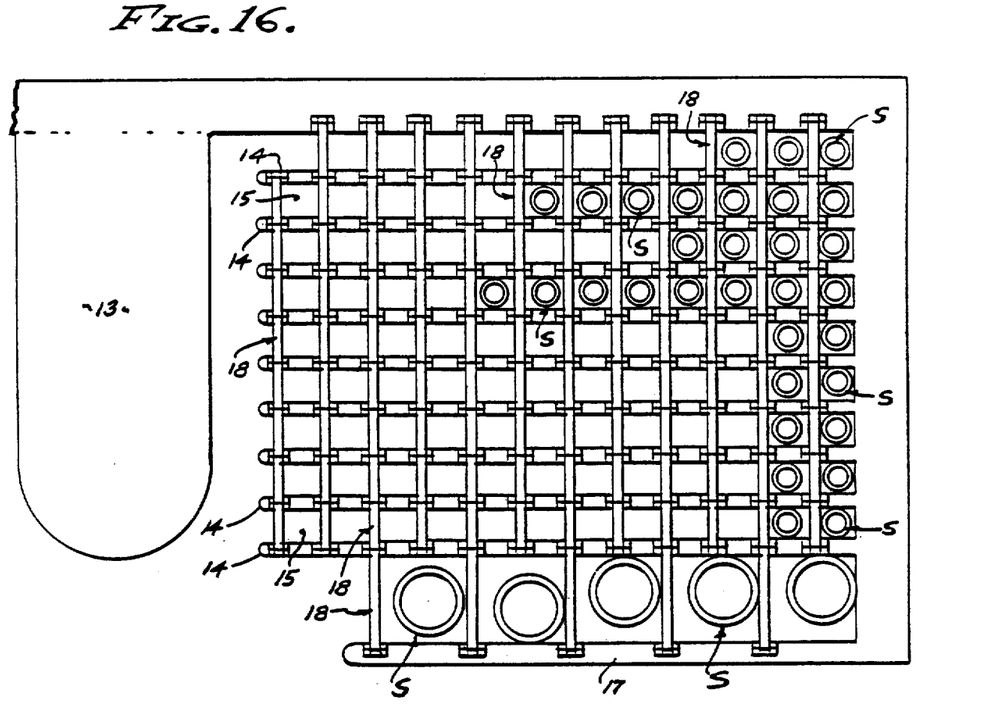
FIG. 16 is an enlarged plan view taken as indicated by line 16—16 on FIG. 1.
Figure 17:
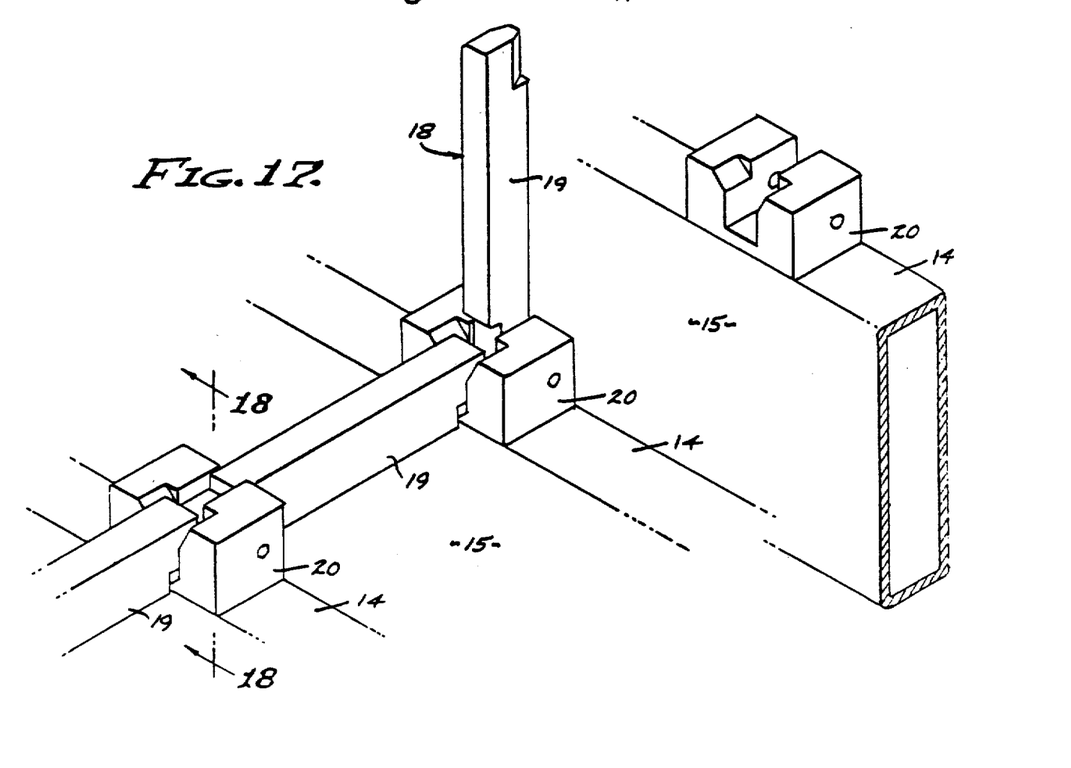
FIG. 17 is an enlarged perspective view showing operation of the locking bars involved in FIG. 16.
Figure 18:
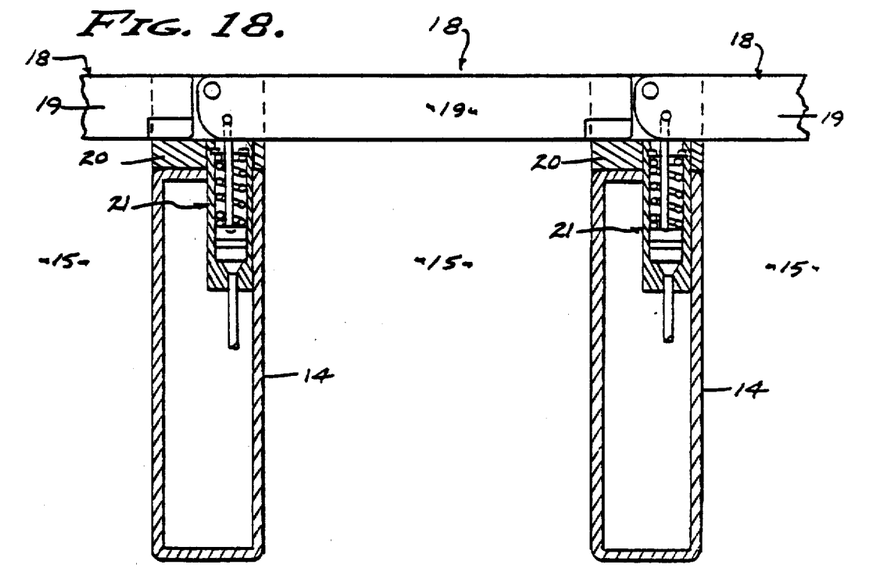
FIG. 18 is a sectional view taken as substantially indicated by line 18—18 on FIG. 17.

The derrickman platform is a horizontally disposed structure adapted to racking of the stands S in close side by side relationship. In the embodiment shown, the fingers 14 are transversely disposed and normal to the monkeyboard 13, of 2 inch width and spaced 5½ inches apart for accommodating up to 5 inch drill pipe, there being a front finger 17 of heavier construction spaced 12 inches for accommodating up to 11¼ inch drill collar. In accordance with this invention, mechanized finger keys 18 are operable to capture individual stands as they are racked between the fingers, the finger keys spanning the spaced and parallel fingers spaced 5½ inches apart so as to provide a pocket for each stand sequentially entered into or removed from the slot. Each finger key comprises a lock bar 19 pivotally carried by a bearing block 20 secured to one finger 16 to swing into and out of engagement with a complementary bearing block 20 secured to an adjacently spaced finger forming the slot therebetween, thereby transferring deflective loading between the fingers. The slot fingers 14 are of tubeform and house hydraulic actuators 21 for the lock bars 19, preferably a cylinder and piston actuator having a rod operating to lift the bar 19 through a crank pin. Thus the slot pocket is opened for reception and removal of a stand by applying hydraulic pressure to one or more actuators 21, thereby lifting lock bars as required.

The "Derrickman" X and "Derrick Floor Hand" Y are alike with respect to the articulated arms A and B, and to the gripper head H, and to the actuating means and controls thereof, it being understood that the size and disposition is to vary with respect to their individual placement within the derrick. Accordingly, there is an inner arm A pivoted on a horizontal axis to either a turret or to a pedestal as hereinafter described, and there is an outer arm B pivotally carried by the aforementioned arm on a horizontal axis at the outer swinging end of said inner arm. The gripper head H is then pivotally carried by said articulated pair of arms on a horizontal axis at the terminal end of the outer arm B. A feature of this invention is means C that actuates and determines angularity of arm B and arm A dependant upon displacement of said arms from said vertical retracted position, and means D that maintains a vertical disposition of the gripper head H in response to angular displacement of the arms A and B from said retracted position. As will be described, the articulation and control is primarily by means of hydraulics in combination with mechanical gearing and/or leverage, all within the confines of said arms and/or mountings therefor. And, a feature of this invention is the substantially rectilinear motion of the gripper head H as it is extended and retracted to engage and move the stands S.

The turret T mounting is characterized by a revolvable plate 22 disposed on a vertical axis and carried by either the carriage E or pedestal P as the case may be. In accordance with this invention, the arms A and B are powered to slew about said vertical axis, there being actuator means F, to rotatably position the turret T as circumstances require. As shown, the turret plate 22 is supported upon a base 23 to revolve on antifriction bearings 23' centered by a trunnion 24. A feature is the compact combination of the carriage or pedestal and turn actuator element which comprises the rotatable trunnion 24 journaled through the base 23 and to which a gear 25 is affixed. Actuation is by means of a cylinder and piston unit 26 carried within the carriage E or pedestal P to rotate a drive gear 25' that meshes with gear 25 to position the plate 22 with respect to the base 23. The compactness is achieved through the right angular relationship of the axes of trunnion 24 and shaft 27 that turns gear 25', the gears 25 and 25' being bevel gears that augment the motion of the cylinder and piston unit. As shown, the drive gear 25' is a segment gear of twice the pitch diameter of driven gear 25, the gear axes being right angularly related and the shaft 27 being driven by a pinion 28 thereon engaged by diametrically opposite piston racks 29 double acting in cylinders 30. Thus the segment gear 25' is positively moved and positioned by fluid introduced into cylinders 30 to shift the piston racks into position commensurate with the required rotation of the plate 22.

The inner arm A swings from the turret T upon a horizontal axis normal to and substantially intersecting the aforesaid vertical turret axis. In practice, the arm mounting axis is offset somewhat for clearance associated with travel of the carriage as will be described, and said horizontal axis of rotation is established by coaxial trunnions 32 extending into a pair of cheek plates 33 in parallel relation disposed symmetrically about the vertical turret axis, with said horizontal axis spaced from and parallel to the plate 22. The arms A and B are tubular box sections for torsional stability, arm A extending from between the cheek plates 33, and arm B extending from between like cheek plates 34 projecting from the forward side of arm A. The arm A is journaled on trunnions 32 to swing forwardly from a vertical position to a substantially horizontal position, through a total angular displacement of 90° with respect to the first mentioned vertical axis. The arm B is journaled on a shaft 35 extending between the pair of cheek plates 34 projecting from the front side of arm A in parallel relation disposed symmetrically thereof, so as to swing forwardly from a vertical position to a horizontal position, through a total angular displacement of 180° with respect to the arm A which carries the same. In the preferred form, the arm A is restricted to 75° displacement while arm B is restricted to 150° displacement so as to retain structural stability as the arms are extended. A feature of this invention is the greater displacement of arm B as compared with arm A, operable between a retracted position where both arms are vertically juxtapositioned and an extended position where one arm extended from the other in substantially horizontal alignment.

Referring now to means C that actuates and determines angular displacement of the two arms A and B, it is significant that this means is carried within the narrow confines of the arm A which is the primary arm that extensibly carries the secondary arm B. In accordance with this invention the means C comprises a double acting cylinder and piston actuator 36 housed within the tubular arm A, with a piston operable therein and with oppositely extending piston rods 37 and 38 interiorly of said arms. As shown, the racks are oppositely faced, rack 39 facing rearwardly to engage a primary gear 41, and rack 40 facing forwardly to engage a secondary gear 42. The primary gear 41 is journaled on a shaft 43 extending between a pair of cheek plates 44 projecting from the back side of arm A in parallel relation disposed symmetrically thereof, while the seconding gear 42 is journaled between the aforementiond cheek plates 34. In practice, the primary and secondary gears are of the same pitch diameter, gear 41 actuating and positioning arm A and gear 42 actuating and positioning arm B. The differential in angular movement between arms A and B is accomplished by a differential pinion gear 45 driven by the primary gear 41 or shaft 43, said pinion being meshed with a stationary gear 46 of twice its pitch diameter. It is to be understood that these are not the only pitch diameters possible to achieve the desired movements, however the embodiment disclosed is the simplest to explain. The gear 46 is stationary with the turret plate 22 and is concentric with shaft 32. In practice, the exposed end portions of the cheek plates are gear segments extending through an arc of 180° as sun gears (46) about which the planet gears (45) move as the arm A swings on the axis of shaft 43. Roller bearings 47 back the racks 39 and 40 for proper gear engagement without back-lash.

Figure 2:
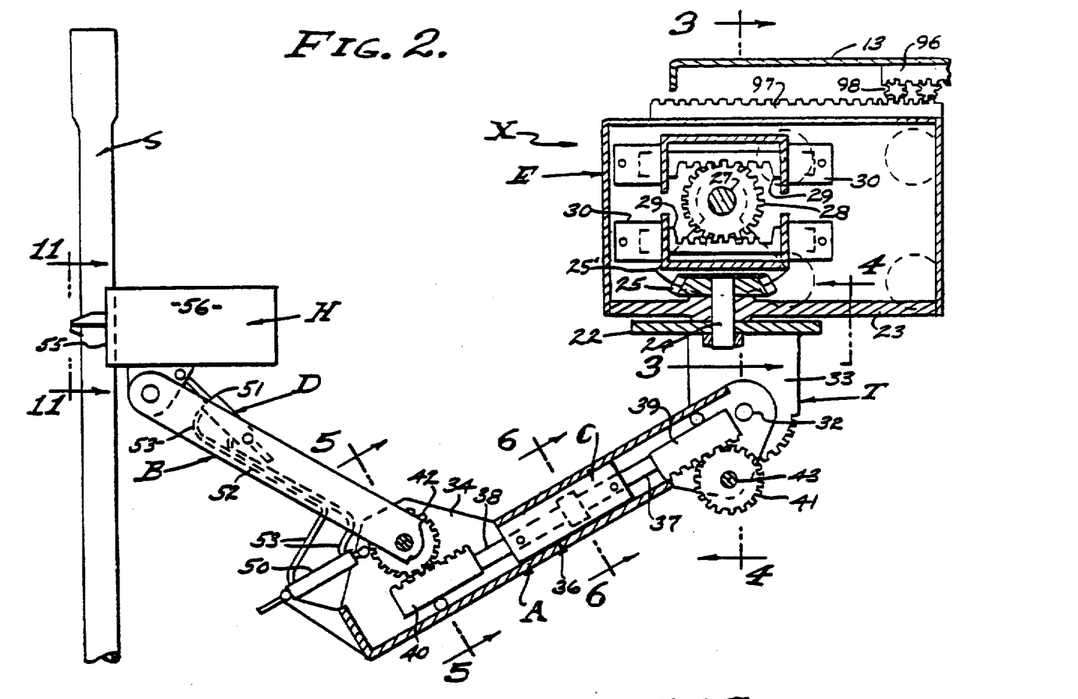
FIG. 2 is an enlarged sectional view taken substantially as indicated by line 2—2 on FIG. 1.
Figure 3:
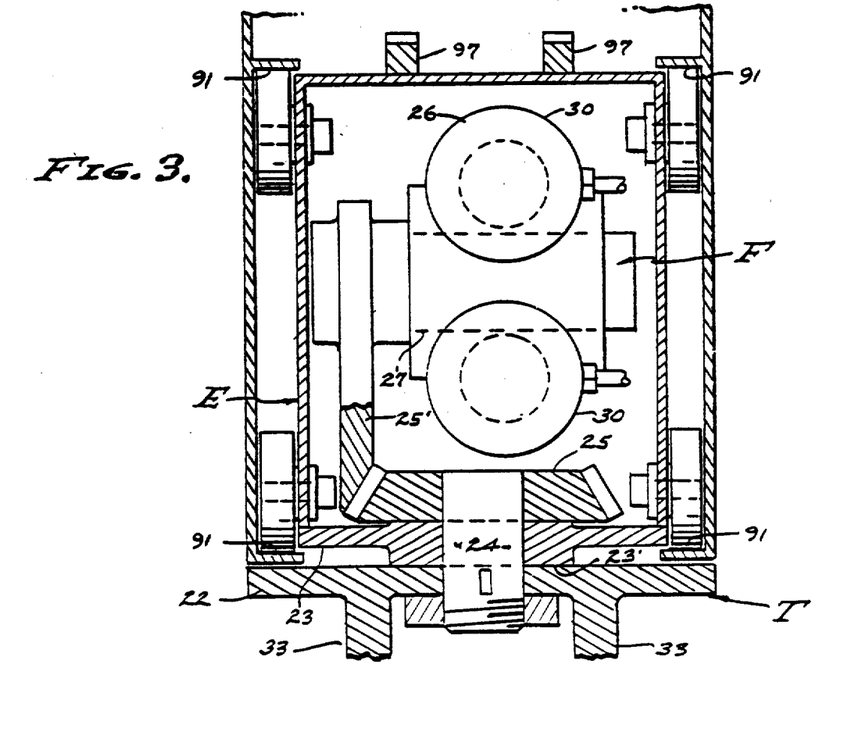
FIGS. 3, 4, 5 and 6 are enlarged sectional views taken as indicated by lines 3—3, 4—4, 5—5, and 6—6 on FIG. 2.
Figure 4:
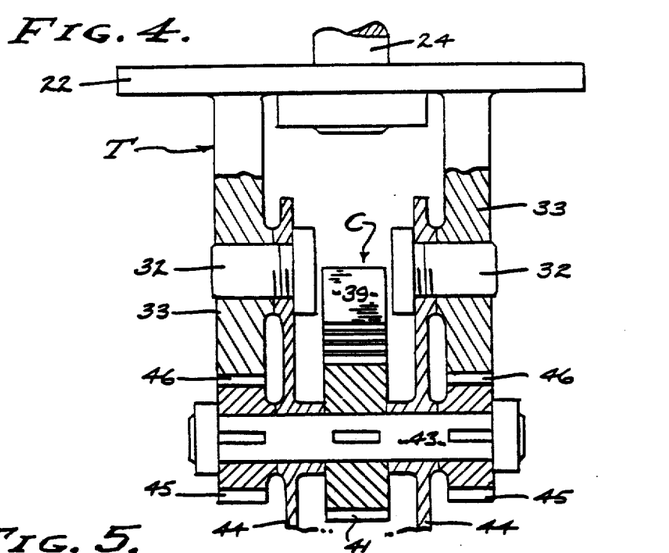
Figure 5:
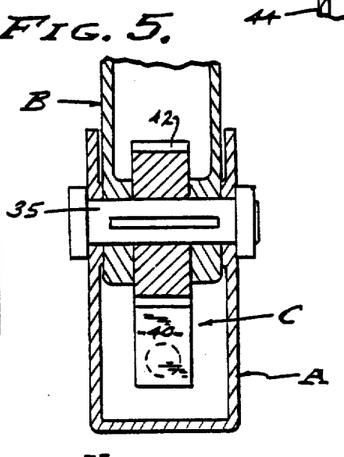
Figure 6:
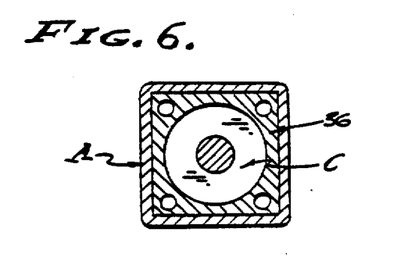
Figure 7:
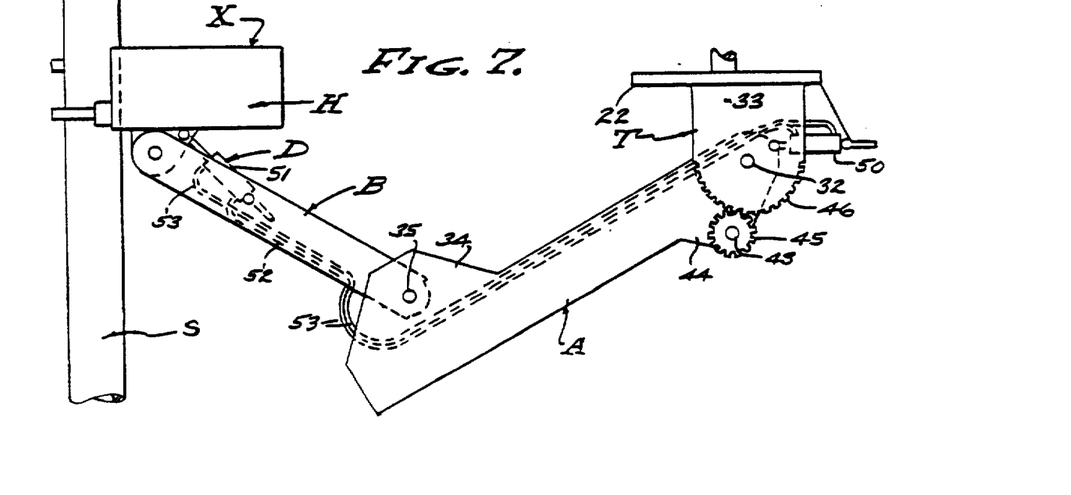
FIG. 7 is a side elevation similar to a portion of FIG. 2 and showing a modified embodiment thereof.
Figure 8:
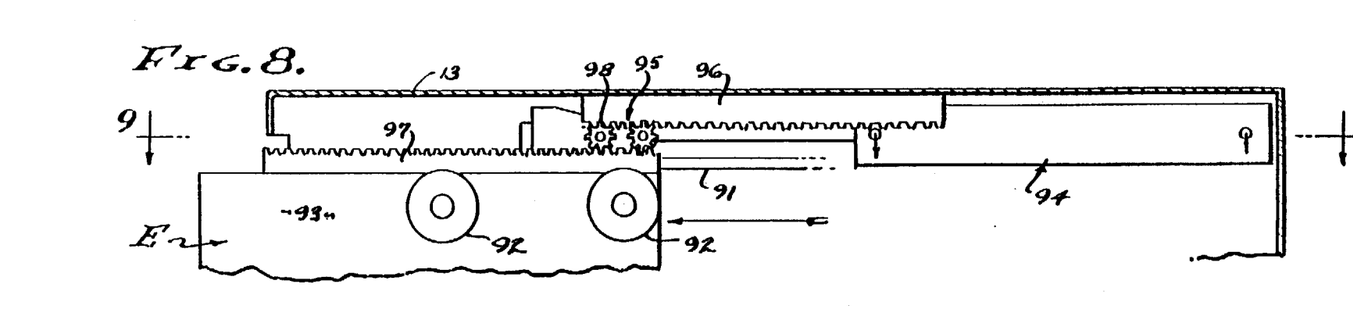
FIG. 8 is an enlarged sectional view taken as indicated by line 8—8 on FIG. 1.
Figure 9:
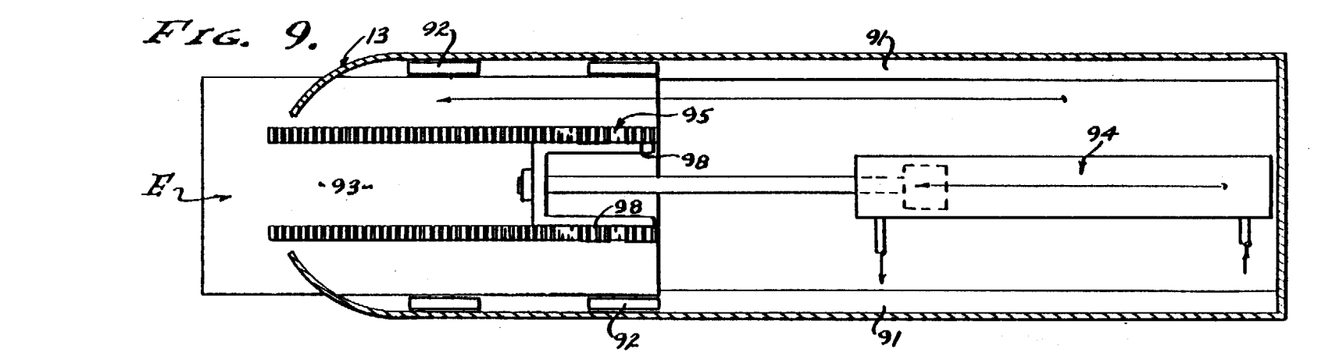
FIG. 9 is a plan section taken as indicated by line 9—9 on FIG. 8.
Figure 10:
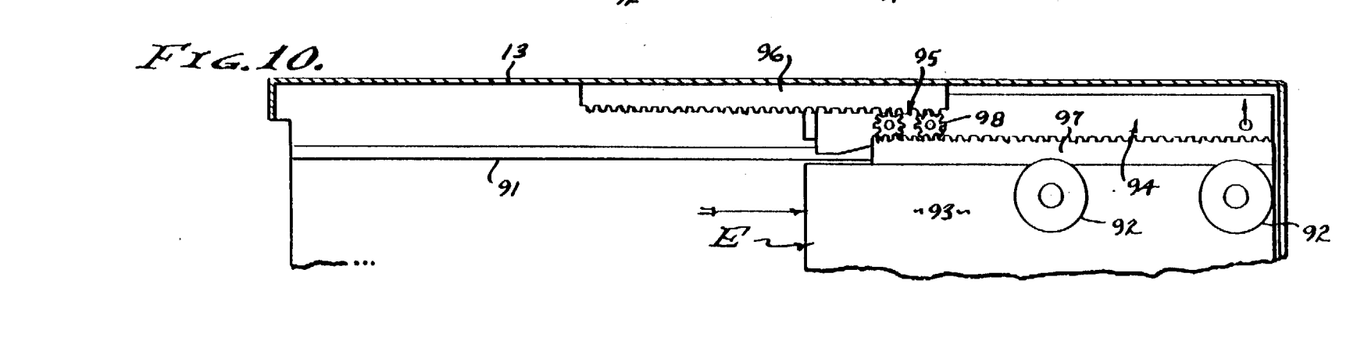
FIG. 10 is a view similar to FIG. 8, showing the retracted position of the carriage therein.
Figure 11:
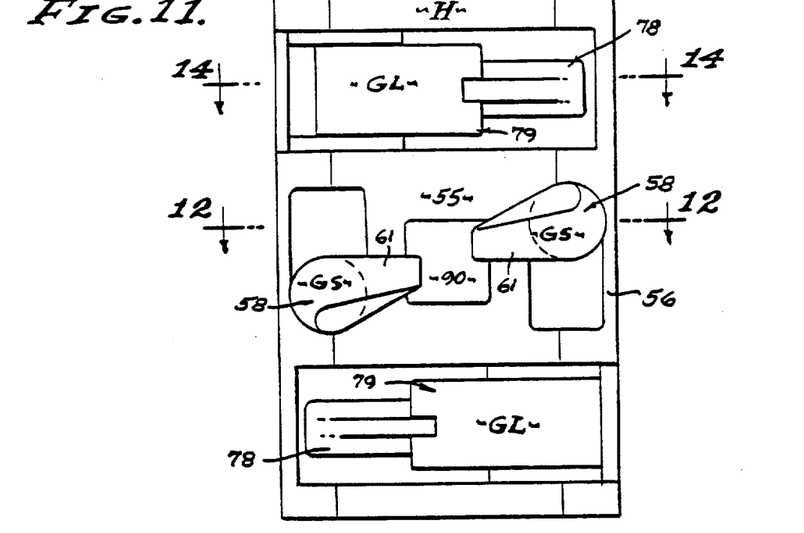
FIG. 11 is an enlarged elevation taken as indicated by line 11—11 on FIG. 2.
Figure 12:
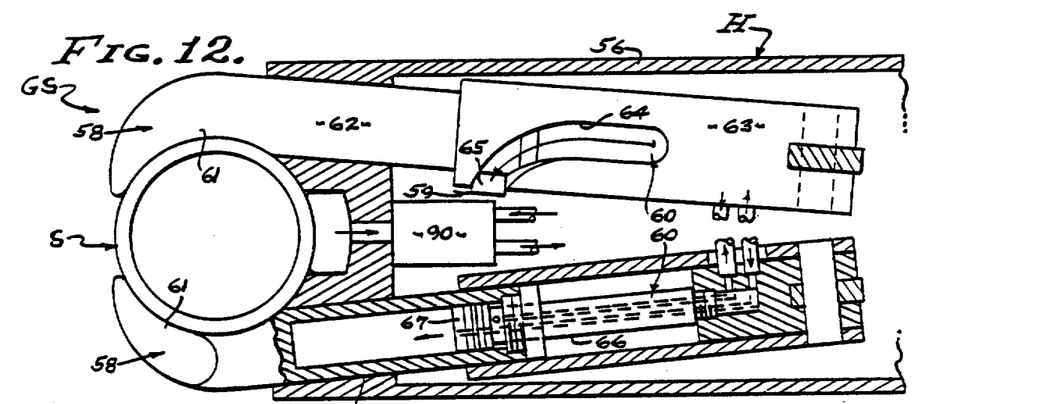
FIG. 12 is a sectional view taken as indicated by line 12—12 on FIG. 11.
Figure 13:
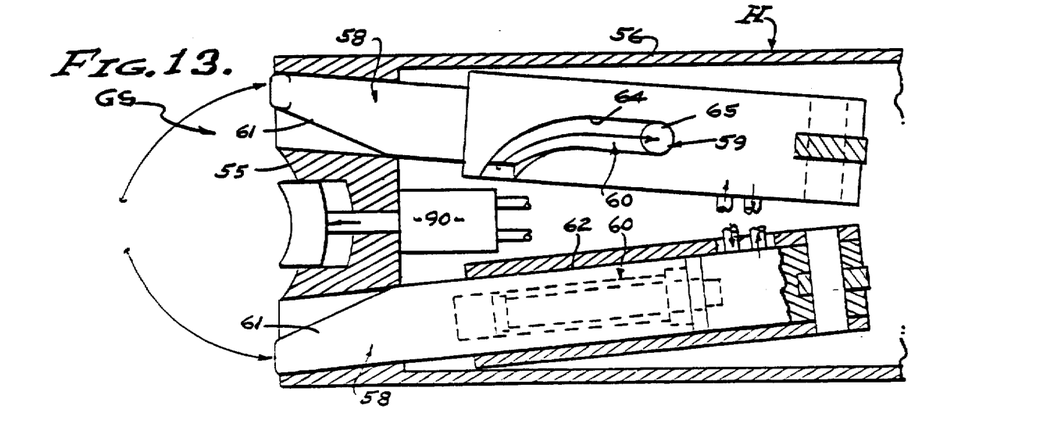
FIG. 13 is a view similar to FIG. 12, showing retraction of the grippers therein.
Figure 19:
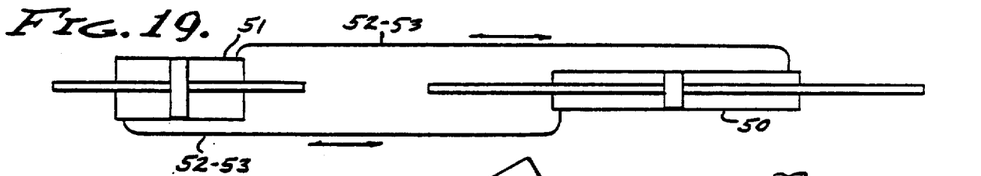
FIG. 19 is a diagramatic view of the master and slave cylinder and piston arrangement of FIG. 2.

Referring now to the means D that maintains the vertical disposition of the gripper head H, hydraulic actuation is preferred therefor. Accordingly, there is a master cylinder and piston unit 50 and a slave cylinder and piston unit 51, the former responsive to angular displacement of one of the arms A or B and the latter positioned by the former to maintain vertical disposition of the gripper head. In one form of the invention shown in FIG. 2, the master unit 50 responds to the angular displacement between arms A and B, in which case the volumetric displacement of slave unit 51 is twice that of said master unit 50. In another form shown in FIG. 7, the master unit 50 responds to the angular displacement between the turret base 22 and arm A, in which case the volumetric displacement of slave unit 51 is the same as that of said master unit 50. As shown, the master units 50 are lever actuated by the motion of the arms, and fluid displaced through the double acting cylinder thereof to the slave units via piping 52 and/or flexible hose 53, as the case may be. The slave unit 51 positions the gripper head H through the double acting cylinder thereof and piston rod connected directly thereto, as shown. A feature of this invention is the substantially straight rectilinear travel of the griper head H between its retracted and extended positions. As shown, this outer secondary arm B is somewhat shorter than the primary inner arm A, in which case the locus of gripper head motion is slightly inclined and also slightly curved. However, it is to be understood that the locus of the gripper head motion can be predetermined by arm length as circumstances require.

Referring now to the gripper head H, a feature is the narrow construction thereof adapted to be inserted between stands S racked in next adjacent slots of the finger board. That is, with the present invention it is a feature that the arms A and B and the gripper head H are operable to the full depth of any finger slot. Accordingly, the width of the gripper head H is 9½ inches so as to fit between next adjacent slots and the stands racked therein. As shown, the operating face 55 of the head H is disposed close to the terminal end of the outer secondary arm B, and is comprised of a box-like housing 56 that extends rearward to overlie the extended arm B and/or to enter between the cheek plates 33 and beneath the turret plate 22 when the arms A and B are retracted and vertical. Thus, compactness is achieved.

Within the gripper head H there is at least one or more gripper means and preferably gripper means GS for stands S of small diameter range and gripper means GL for stands S of large diameter range. The gripper means GS and GL are hydraulically operated to embrace said small and large diameter ranges of the pipe and/or collar sizes herein above referred to, the gripper mean GS being specially adapted to embrace pipe sizes substantially less than the 5½ inch width of the gripper head housing 56, ie. the aforementioned 3¼ to 5 inch range; and the gripper mean GL being specially adapted to embracing pipe sizes approaching and in excess of the width of the gripper head housing 56, i.e. the aforementioned 5 to 11¼ inch range.

The gripper means GS for the small pipe size range is comprised, generally, of a pair of retractile claws 58 that rotate into pipe embracement by cam means 59 as they are advanced by actuator means 60; and reversely to rotate out of pipe embracement as they are retracted. That is, the claws 58 extend from face 55 to embrace and to release the stand S juxtapositioned to said face of the housing. There is a pair of claws 58 carried in spaced relation, one at each side of the housing 56 so as to embrace the stand S from diametrically opposite sides. As shown, the claws are alike and comprised of an arcuate member 61 to conform with the largest diameter pipe to be engaged, and a cylindrical shank 62 slideably entering into a mounting sleeve 63. The said arcuate member is hooked laterally of the axis of the shank cylinder and sleeve, about which axis it revolves 90° between a retracted position in which said members turn parallel to the stands S, and an extended position in which said member turns transverse to hookedly engage the stand S, as shown. In practice, the axes of the two claw units are divergent for improved access of the larger diameter stand S therebetween, the arcuate member 61 being tapered outwardly to their tips. The sleeve 63 is provided with a helical cam slot 64 of means 59 that rotates the cylindrical shank 63 in response to axial shifting thereof by actuator means 60. In practice, there is a follower 65 on the shank 62 that is captured and limited as to axial motion by the cam slot 64. Actuator means 60 can vary in form as a cylinder and piston unit, and in accordance with this invention is compactly embodied within the said shank 62; there being a piston rod 66 fixed to the sleeve 63 by a header, with a piston 67 operable within a double acting cylinder formed in the shank 62. As shown, fluid connection is through the header and piston rod to opposite sides of the piston whereby the claw reciprocably extends and retracts from and into the housing 56.

The gripper means GL for the large pipe size range is comprised, generally, of a pair of retractile claws 78 that slide into pipe embracement by rocker means 79 as they are advanced by actuator means 80a and 80b; and reversely to slide out of pipe embracement as they are retracted. That is, the claws 78 extend from face 55 and retract into the housing 56, to embrace and to release the stand S juxtapositioned to said face of the housing. There are claws 78 carried in spaced relation at each side of the housing 56 so as to embrace the stand S from diametrically opposite sides. As shown, the claws are alike and comprised of an arcuate member 81 to conform with the largest diameter pipe to be engaged, and the rocker means 79 that is advanced by actuator means 80a followed by advancement means 80b. The said arcuate member 81 is a semi circular part extending aproximately 105° throughout the circumference of the largest diameter pipe to be embraced, and it is extensibly carried by the said rocker means 79. A feature of this claw embodiment is the extensibility of both the pipe engaging member 81 and the rocker means 79 which slideably carries the same, these two parts being retractably extensible laterally of the gripper head H, one claw 58 from each side thereof and for example one above and one below the aforementioned gripper means H.

Figure 14:
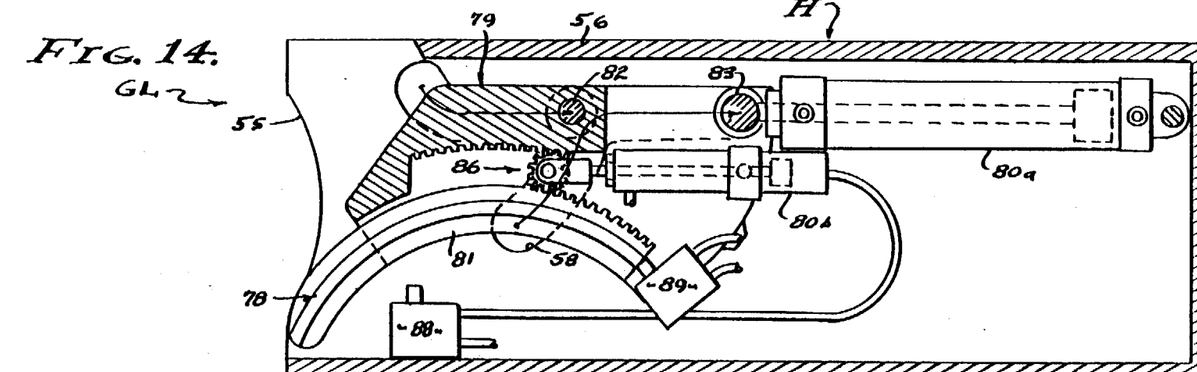
FIG. 14 is a sectional view taken as indicated by line 14—14 on FIG. 11.
Figure 15:
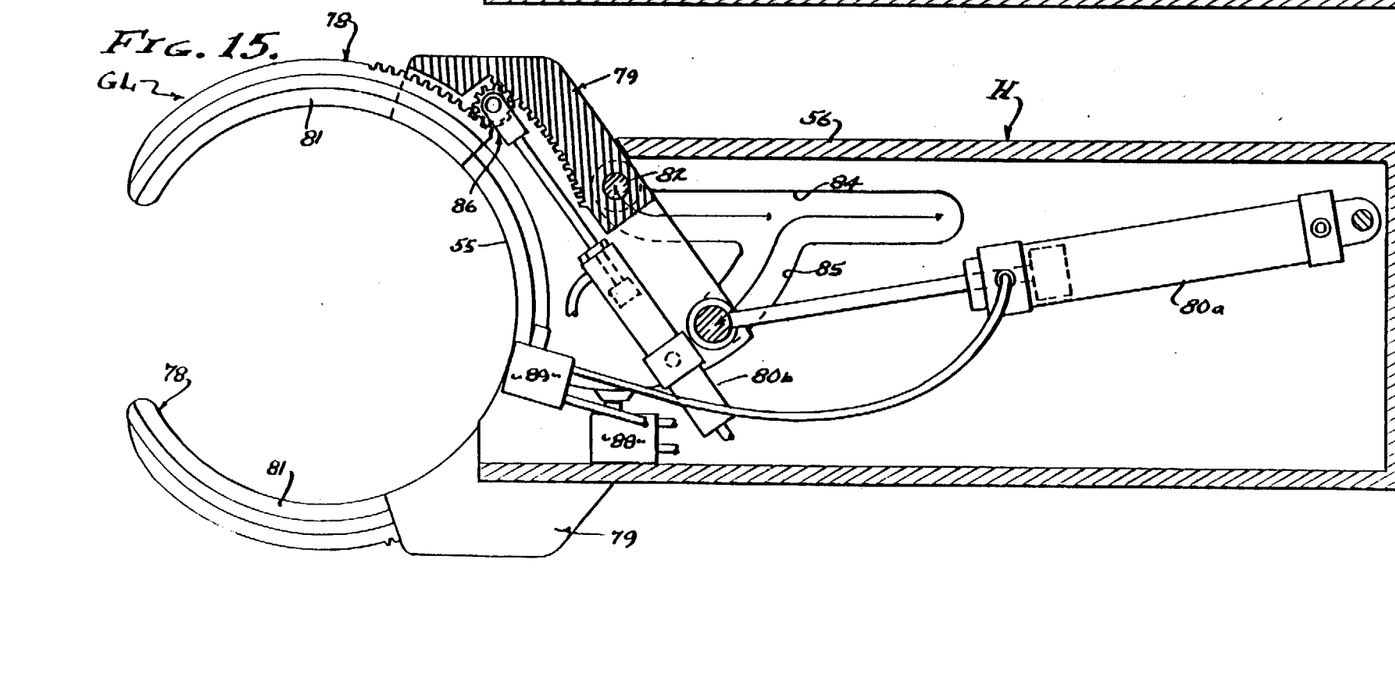
FIG. 15 is a view similar to FIG. 14, showing retraction of the grippers therein.

The gripper claws 78 are right and left hand assemblies, and being alike a description of one will suffice for both. As shown in FIG. 14 the rocker means 79 is an articulated carriage for the arcuate claw member 81, and in accordance with this invention is shiftably supported by spaced trunnions 82 and 83 operable forwardly of the head H to an extended position followed by a laterally shifted position (See FIG. 15). The rocker 79 is pivoted upon the centered trunnions 82 and is retractably driven forward by the rearmost trunnions 83, by means of the articulated cylinder and piston actuator means 80a pivotally anchored in the gripper head rearward of upper and lower guideways 84 in the restrictive positioning of the rocker 79 thereby, both extended and retracted; and to effect laterally outward shifting thereof when forwardly disposed. To these ends, the forward portion of the guideway 84 is turned outwardly so as to offset the axis of trunnions 82 from the drive axis of the actuator 80a; and there is a lateral guideway 85 described about the stopped axis of trunnions 82 to receive and direct the trunnions 83 to a stopped position with the rocker means displaced approximately 55°, and so that the two claws 78 are 110° divergent. It will be seen that the actuator mean 80a drives the rocker means forwardly to extend from the face 55 of the gripper head H and laterally from the housing 56 thereof.

The arcuate claw member 81 is retractably extensible from the rocker means 79 through an arcuate opening therein at the extensible end thereof remote from the trunnions 82 and 83. The rocker means 79 and claw member 81 are extended in a horizontal lateral plane, the member 81 being slideably carried at the inside of the rocker means 79 and exposed forwardly when said means is shifted to the extended position. The pair of two claws 78 together with a center portion formed by the concave face 55 establish a support to be engaged by the pipe, total arc of 140° as shown. The claw member 81 retracts into the rocker means 79 and projects therefrom 80° when extended thereby leaving a void of 60° between opposite claws. In accordance with this invention, the actuator means 80b drives the member 81 through a stroke multiplier means 86, preferably a differential rack and pinion device comprising a fixed internal rack segment on the rocker means 79 and a moveable external rack segment on the claw member 81, there being a drive pinion 87 engageably operable tangentially therebetween. The actuator 80b is a cylinder and piston actuator pivotally anchored to the rocker means adjacent the trunnions 83 and has a piston rod with a clevis rotatably carrying the drive gear pinion 87. Although the pitch diameter of the two gear segments vary, the ratio of movement is substantially three-to-one. That is, the circumferential movement of claw member 81 is to be considered three times greater than the piston travel of actuator 80b.

Control of the gripper means GS and GL is remote by hydraulic valve means (not shown). In the case of gripper means GS the actuator means 60 is double acting to either extend or retract the claws 58. In the case of gripper means GL the actuator means 80a and 80b are sequentially operated, firstly to extend the rocker means 79 and then to extend the claw member 81, and secondly to retract the claw member and then the rocker means. Sequencing of gripper means GL is by means of preempting valves 88 and 89, one in the fluid line to extend the actuator 80b and the other in the fluid line to retract the actuator 80a. The valve 88 is opened when the rocker means 79 is stopped in guideway 85, and the valve means 89 is opened when the claw means 81 is fully retracted, the two actuators being operated from a common pair of fluid control lines, in parallel. A feature is a pilot valve 90 tht senses positioning of the stand S engaged against face 55 to initiate closing action by the controlling valve means that supply the double acting cylinder and piston actuators operable as above described.

The "Derrickman" version of the present invention is supported by the carriage E for excursions substantially coextensive of the monkeyboard 13, and in practice tracks 91 for the carriage underlie or replaces the said monkeyboard. As shown therefore, the tracks 91 comprise spaced rails beneath the opposite margin of the monkeyboard, extending from the off draw works side of the derrick to the terminal end of the board just short of the elevator area. In practice there are upper and lower tracks 91 at each side, said tracks being opposed to be engaged by rollers 92 supporting the carriage truck 93, there being two pairs of upper and lower rollers at each side of the track. The truck 93 houses the actuator mean F, including the cylinder and piston unit 26 and the gears 25 and 25', operable as hereinabove described to slew the arms A and B with the gripper head H positioned thereby. Accordingly, the carriage truck 93 carries the turret T on forward and backward excursions on a vertical axis depending beneath the monkeyboard 13 and into alignment with predetermined station points opposite the plurality of finger slots 15 at either the right or left alley as circumstances require.

In carrying out this embodiment of the invention, the above described monkeyboard tracks 91 are structural members extending from a framework that comprises the derrickman platform and all of which is to be built into or retrofitted to the derrick Z. As shown, the tracks 91 are inwardly turned channel-shaped web members cantilevered from the off draw works side or the derrick truss, with actuator means 94 therebetween to transport the carriage E through said excursions, and for stationed positioning thereof. In accordance with this invention, the actuator means 94 transports the truck 93 through a stroke multiplier means 95, preferably a differential rack and pinion device comprising a fixed rack 96 section fixed beneath the monkey board and a moveable rack section 97 on the truck 93, there being a drive pinion 98 engageably operable therebetween. The racks 96 and 97 are opposed and separated by the pinion or pinions 98, there being spaced pairs of pinions engageable with a pair of parallel racks, for stability. The actuator means 94 is a cylinder and piston actuator anchored between the fixed racks 96 and has a piston rod with a yoke 99 that carries the gear pinions 98 on journals to rotatably engage said opposed racks 96 and 97. The augmented rectilinear movement of racks 97 and the attached truck 93 is three-to-one, or three times greater than the piston travel of actuator means 94. Thus, the turret T slews the retracted gripper head H into alignment with either the right or left alley of the monkeyboard-fingerboard combination, and the carriage E operates to transport the gripper head H to the desired station in alignment with a finger slot 15, all as may be required.

Figure 20:
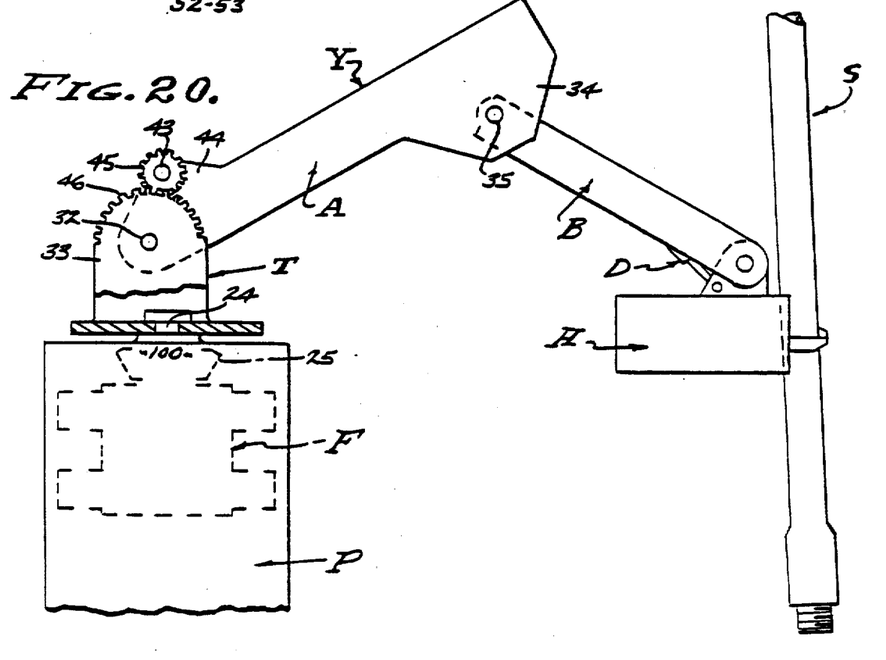
FIG. 20 is an enlarged side elevation of the derrick floor hand taken as indicated by line 20—20 on FIG. 1.

The "Derrick Floor Hand" version of the present invention is supported by the pedestal P for stationary slewing about a vertical axis projecting vertically from the derrick floor 10. In practice, the pedestal P is a column that houses the actuator means F, including the cylinder and piston unit 26 and the gears 25 and 25' operable as hereinabove described to slew the arms A and B with the gripper head H positioned thereby. Accordingly, the head 100 of the pedestal P carries the turret T on a vertically disposed axis substantially above the derrick floor 10, for positioning the gripper head H as may be required.

Control of the operative means hereinabove described is by means of hydraulic valves, preferably manually controlled valves located at observation positions of the crew members operating the rig. The hydraulic lines necessary for actuating the various cylinder and piston means extend to the appropriate ends of the cylinders thereof to actuate the same as hereinabove described. For example, the "Derrickman" version is operable from either the elevated platform or from the derrick floor, and the lifting of finger bars 19 and station alignment of the gripper head H with the various slots 15 can be predetermined by automation, or purely manual as may be desired. It will be seen therefore, that the rig operating procedures and crew responsibilities are adhered to for accepted and time proven drilling operations and the like.

Having described only a typical preferred form and application of my invention, I do not wish to be limited or restricted to the specific details herein set forth, but wish to reserve to myself any modifications or variations that may appear to those skilled in the art.

I claim:

1. A "gripper head" for moving pipe stands in a derrick and between selective positions, the gripper head having a vertically disposed substantially flat unobstructed front face, means selectively positioning the gripper head in a disposition with the unobstructed front face thereof to oppose the side of the pipe stand to be moved, at least one pair of laterally spaced and extensible claws carried by and retractile into the confines of the gripper head behind said front face thereof, and means to extend the said claws from the unobstructed front face and into embraced engagement with a pipe stand juxtaposed to the said front face and to retract the said claws through the unobstructed front face and into the confines of the gripper head to be totally housed therein after release of the pipe stands.

2. The "gripper head" with extensible and retractable claws for embraced engagement and release of pipe stands and the like as set forth in claim 1, wherein the claws are hook-shaped in conformance with the pipe exterior embraced thereby.

3. The "gripper head" with extensible and retractable claws for embraced engagement and release of pipe stands and the like as set forth in claim 1, wherein the claws are arcuately hooked to a radius in conformance with the largest pipe diameter in a range of pipe diameters embraceable thereby.

4. The "gripper head" with extensible and retractable claws for embraced engagement and release of pipe stands and the like as set forth in claim 1, wherein there are two pairs of claws and the claws of one pair thereof are arcuately hooked to a radius in conformance with the largest pipe diameter in a range of small pipe diameters embraceable thereby and wherein the claws of the second pair thereof are arcuately hooked to a radius in conformance with the largest pipe diameter in a range of large pipe diameters embraceable thereby.

5. The "gripper head" with extensible and retractable claws for embraced engagement and release of pipe stands and the like as set forth in claim 1, wherein there are two pairs of claws and the claws of one pair thereof are arcuately hooked to a radius in conformance with the largest pipe diameter in a range of small pipe diameters embraceable thereby, and wherein the claws of the second pair thereof are arcuately hooked to a radius in conformance with the largest pipe diameter in a range of large pipe diameters embraceable thereby, the largest arcuate hook of the small range claws conforming substantially to the smallest pipe diameter in the range of said large pipe diameters.

6. The "gripper head" with extensible and retractable claws for embraced engagement and release of pipe stands and the like as set forth in claim 1, wherein there are at least two pairs of claws symmetrically disposed about the engageable axis of the pipe embraced thereby, the pairs of claws being carried by the gripper head one above the other.

7. The "gripper head" with extensible and retractable claws for embraced engagement and release of pipe stands and the like as set forth in claim 1, wherein ther are two pairs of claws symmetrically disposed about the engageable axis of the pipe embraced thereby, one pair of claws disposed in a horizontal plane and proportional to conform with the largest pipe diameter in a range of small pipe diameters embraceable thereby, and one of each of the second pair of claws disposed in offset horizontal planes above and below the horizontal plane of the first mentioned pair of claws respectively and proportioned to conform with the largest pipe diameter in a range of large pipe diameters embraceable thereby.

8. A "gripper head" for moving pipe stands in a derrick and between selective positions, the gripper head having a vertically disposed unobstructed front face, means selectively positioning the gripper head in a disposition with the unobstructed front face thereof to oppose the side of the pipe stand to be moved, a pair extensible claws carried by and retractile into the gripper head on laterally spaced axes, and means to axially extend the said claws along the said spaced axes and into embraced engagement with a pipe stand juxtaposed to said front face and alternately to axially retract the said claws along the said spaced axes and into the confines of the gripper head to be housed behind said front face thereof.

9. The "gripper head" with extensible and retractable claws for embraced engagement and release of pipe stands and the like as set forth in claim 8, wherein the claws are hook-shaped in conformance with the pipe exterior embraced thereby and are rotatably carried in the gripper head on said laterally spaced axes, and wherein the means to axially extend the said claws rotates the hook-shape thereof into embracement of the pipe exterior when extended and rotates the same to release the pipe from embracement when axially retracted.

10. The "gripper head" with extensible and retractable claws for embraced engagement and release of pipe stands and the like as set forth in claim 8 wherein the spaced axes of the claws are divergent to expand the separation thereof to accommodate larger diameter pipe.

11. The "gripper head" with extensible and retractable claws for embraced engagement and release of pipe stands and the like as set forth in claim 8, wherein the claws are hook-shaped in conformance with the pipe exterior embraced thereby and are rotatably carried in the gripper head on said laterally spaced axes, and wherein the means to axially extend the said claws includes a cam that rotates the hook-shape thereof into embracement of the pipe exterior when extended and that rotates the same to release the pipe from embracement when axially retracted.

12. The "gripper head" with extensible and retractable claws for embraced engagement and release of pipe stands and the like as set forth in claim 8, wherein the spaced axes of the claws are divergent to expand the separation thereof to accommodate larger diameter pipe and wherein the claws are hook-shaped in conformance with the pipe exterior embraced thereby and are rotatably carried in the gripper head on said laterally spaced axes, and wherein the means to axially extend the said claws rotates the hook-shape thereof into embracement of the pipe exterior when extended and rotates the same to release the pipe from embracement when axially retracted.

13. The "gripper head" with extensible and retractable claws for embraced engagement and release of pipe stands and the like as set forth in claim 8, wherein the means to extend the claws is enabled to operate by separate means projecting from the face of the gripper head and responsive to a pipe stand juxtaposed thereto.

14. A "gripper head" for moving pipe stands in a derrick and between selective positions, the gripper head having a vertically disposed unobstructed front face, means selectively positioning the gripper head in a disposition with the unobstructed front face thereof to oppose the side of the pipe stand to be moved, a pair of horizontally extensible claws slideable in a pair of rockers shiftably carried to be retractile into and one at each side of the gripper head, and means to extend the said rockers horizontally from the front face and to extend the claws into embraced engagement with a pipe stand juxtaposed to said front face and alternately to retract the said claws and the said rockers into the confines of the gripper head to be housed behind said front face thereof.

15. The "gripper head" with extensible and retractable claws for embraced engagement and release of pipe stands and the like as set forth in claim 14, wherein the rockers are shiftable to project from the front face of the gripper head.

16. The "gripper head" with extensible and retractable claws for embraced engagement and release of pipe stands and the like as set forth in claim 14, wherein the claws are hook-shaped in conformance with the pipe exterior embraced thereby and slideable laterally from said rockers to embrace the pipe stand.

17. The "gripper head" with extensible and retractable claws for embraced engagement and release of pipe stands and the like as set forth in claim 14, wherein the rockers are shiftable to project from the front face of the gripper head, and wherein the claws are hook-shaped in conformance with the pipe exterior embraced thereby and slideable laterally from said rockers to embrace the pipe stand.

18. The "gripper head" with extensible and retractable claws for embraced engagement and release of pipe stands and the like as set forth in claim 14, wherein the rockers are shiftable along spaced guideways in opposite sides of the gripper head, said guideways being turned laterally outward to separate the claws to expand the separation thereof to accommodate larger diameter pipe.

19. The "gripper head" with extensible and retractable claws for embraced engagement and release of pipe stands and the like as set forth in claim 14, wherein the rockers are shiftable on front and back trunnions along spaced guideways in opposite sides of the gripper head, said guideways being turned laterally outward to separate the front trunnions and each having inwardly turned arcuate guide portions described about the center of the front trunnions stopped in the first mentioned laterally outward turned portions thereby to swing the rockers laterally outward to expand the separation of the opposite claws of said pair thereof.

20. The "gripper head" with extensible and retractable claws for embraced engagement and release of pipe stands and the like as set forth in claim 14, wherein the claws are semi circular arc-shaped members slideable from complementary semi circular guideways in the rockers to embrace opposite sides of the pipe stand respectively.

21. The "gripper head" with extensible and retractable claws for embraced engagement and release of pipe stands and the like as set forth in claim 14, wherein the rockers are shiftable on front and back trunnions along spaced guideways in opposite sides of the gripper head, said guideways being turned laterally outward to separate the front trunnions and each having inwardly turned arcuate guide portions described about the center of the front trunnions stopped in the first mentioned laterally outward turned portions thereby to swing the rocker laterally outward to expand the separation of the opposite claws of said pair thereof, and wherein the claws are semi circular arc-shaped members slideable from complementary semi circular guideways in the rockers to embrace opposite sides of the pipe stand respectively.

22. The "gripper head" with extensible and retractable claws for embraced engagement and release of pipe stands and the like as set forth in claim 14, wherein the rockers are actuated to project from the front face of the gripper head by double acting drive means.

23. The "gripper head" with extensible and retractable claws for embraced engagement and release of pipe stands and the like as set forth in claim 14, wherein the claws are hook-shaped in conformance with the pipe exterior embraced thereby and slideably actuated by double acting drive means to extend laterally from said rockers to embrace the pipe stand.

24. The "gripper head" with extensible and retractable claws for embraced engagement and release of pipe stands and the like as set forth in claim 14, wherein the claws are hook-shaped in conformance with the pipe exterior embraced thereby and slideably actuated by double acting motion multiplying means to extend laterally from said rockers to embrace the pipe stand.

25. The "gripper head" with extensible and retractable claws for embraced engagement and release of pipe stands and the like as set forth in claim 14, wherein the rockers are actuated to project from the front face of the gripper head by double acting drive means, and wherein the claws are hook-shaped in conformance with the pipe exterior embraced thereby and slideably actuated laterally from said rockers to embrace the pipe stand by double acting drive means.

26. The "gripper head" with extensible and retractable claws for embraced engagement and release of pipe stands and the like as set forth in claim 14, wherein the rockers are actuated to project from the front face of the gripper head by double acting drive means, and wherein the claws are hook-shaped in conformance with the pipe exterior embraced thereby and slideably actuated laterally from said rockers to embrace the pipe stand by double acting motion multiplying means.

27. The "gripper head" with extensible and retractable claws for embraced engagement and release of pipe stands and the like as set forth in claim 14, wherein the means to extend the claws is enabled to operate by separate means projecting from the face of the gripper head and responsive to a pipe stand juxtaposed thereto.

* * * * *